United States Patent [19]

Katz et al.

[11] Patent Number: 4,575,842

[45] Date of Patent: Mar. 11, 1986

[54] SURVIVABLE LOCAL AREA NETWORK

[75] Inventors: Joseph L. Katz, Bedford; Edward C. Grund, Burlington; Richard P. Cope, Woburn; Alvin L. Glick, Lexington, all of Mass.

[73] Assignee: The United States of America as represented by the Secretary of the Air Force, Washington, D.C.

[21] Appl. No.: 610,148

[22] Filed: May 14, 1984

[51] Int. Cl.[4] .............................................. H04Q 9/00
[52] U.S. Cl. ................................. 370/16; 340/825.01; 179/18 EE; 371/7
[58] Field of Search ..................... 370/16; 340/825.01; 179/18 EE; 371/7, 8, 11, 67, 68, 71

[56] References Cited

U.S. PATENT DOCUMENTS

| Re. 28,958 | 9/1976 | Zafiropulo et al. | 340/825.01 |
|---|---|---|---|
| 3,162,827 | 12/1964 | Border et al. | 333/2 |
| 3,275,749 | 9/1966 | Kunihiro et al. | 179/15 |
| 4,075,440 | 2/1978 | Laubengayer | 179/175.3 S |
| 4,254,496 | 3/1981 | Munter | 370/16 |
| 4,308,613 | 12/1981 | Chasek | 370/94 |
| 4,380,061 | 4/1983 | Mori et al. | 370/16 |

Primary Examiner—Joseph A. Orsino, Jr.
Assistant Examiner—Timothy K. Greer
Attorney, Agent, or Firm—Donald J. Singer; Willard R. Matthews

[57] ABSTRACT

Enhanced availability and survivability of communications between geographically remote locations with a minimum of redundancy of transmission facilities and media is provided by a survivable bus network capable of providing continued interprocessor or other communications in the event of multiple bus outages. It consists of multiple busses, bus isolation device (BIDs) and two types of network interface processors (NIPs). The BIDs electrically isolate bus segments on either side of a connection so that if a fault occurs only the segment containing the fault will be affected. The first type of NIP connects to one bus and performs the usual function of providing an electrical and software interface between the network and one or more subscriber processors. The second type is a bridge which performs these same functions but connects to two busses and has the capability to transfer traffic as it appears on either bus to the other. The network provides increased survivability in the event of failed segments but does not entail the expense of a fully redundant system.

6 Claims, 7 Drawing Figures

BEFORE ATTACK

AFTER ATTACK

SURVIVABLE LOCAL AREA NETWORK

STATEMENT OF GOVERNMENT INTEREST

The invention described herein may be manufactured and used by or for the Government for governmental purposes without the payment of any royalty thereon.

BACKGROUND OF THE INVENTION

The present invention relates to interprocessor communications systems and specifically to survivable local area networks.

Communications networks that link the data processors of geographically dispersed facilities are subject to failure from human error, facility destruction or a variety of natural and artificial calamities. Whether the transmission medium is through guided wires or through the air, such as by radio, optical or infrared waves, or microwaves, failure can occur randomly, often in unanticipated patterns.

An important component of a survivable distributed processing system is a communications network that can resist degradation due to node or link outages. Local area bus network technology has proven effective in interconnecting terminals and processors by providing flexible and high rate data service. Local bus networks employ a bus transmission structure to provide communications in a limited geographical area, such as an office building complex, air base, campus, or city. The bus permits many subscriber data processing nodes to be attached to a single physical link and affords two-way communications among them. All nodes can "hear" all signals, and any node can communicate directly with any other node. The bus also allows the passive attachment of nodes, so that failures in any node will not disrupt the network.

Traditional methods of improving the survivability of a bus network include hardening the bus so that faults are difficult to introduce; employing redundant busses and providing switching among them in the event of an outage, so that more faults are required to disrupt communications; or some combination of hardening and redundancy.

Hardening and redundancy is both expensive and a technically insufficient solution for making distributed processing system survivable. One fault in a bus can disrupt the bus communications and faults on all busses can disrupt the network. The task of enhancing the survivability of distributed processing systems has been alleviated to some degree by prior art techniques. The extent of these prior art techniques is given by the following patents: U.S. Pat. No. 3,162,827 issued to Border et al on Dec. 22, 1964, U.S. Pat. No. 3,275,749 issued to Kunihiro et al on Sept. 27, 1966, U.S. Pat. No. 4,075,440 issued to Laubengayer et al on Feb. 21, 1978, U.S. Pat. No. 4,254,496 issued to Munter on Mar. 3, 1981, U.S. Pat. No. 4,308,613 issued to Chasek on Dec. 29, 1981, and U.S. Pat. No. 4,380,061 issued to Mori et al on Apr. 12, 1983.

The patents of Munter, Chasek and Border et al disclose some developments beyond the traditional solution of redundancy. Border et al in addition to the costly redundant network of separate transmission facilities and separate communications lines, presents a primitive fuse assembly that disconnects branches when a short occurs. Munter's invention has a primary and secondary multiplexer bus with automatic switching between busses. Munter's device has limited improvements in system availability: a bus failure occuring in both the primary and secondary busses renders the system inoperable to all users. The Chasek invention provides a method of automatically bridging in-line failed stations emitting microwave transmissions or electromagnetic signals. While the automatic bridging feature is a development, Chasek's solution consists of redundancy in the form of a matrix of equi-distant in-line stations which is effective but expensive.

Laubengayer discloses a communication system which automatially reconfigures itself upon failure of detection of a carrier signal in one of the links. Switches are automatically actuated to connect the momentarily unconnected portion of the broken link to the link that is still intact. Communication is restored in the new link configuration. Laubengayer is an improvement over the Munter device. An entire bus or loop should not be disabled when a fault occurs: only the faulty area should be isolated. However, Laubengayer's device still has a limitation in that in the event of multiple loop failures, entire sections of the loop are cut off with the only design alternative being the duplication of loops in traditional redundancy.

Kunihian et al provides the most reliability and availability of all the prior art systems by a combination of design and redundancy. Each user is interconnected in a multiplex switching system with each transmision line. The problem with the approach is the excessive expense if one particular user is remote from one of the transmission lines. A better approach would not require each user to be connected to each line, but should have interconnections between lines that isolate only the faulty areas and provide cross communication between different transmission lines.

The goal of effective cross communications between transmission lines is best demonstrated by Mori et al where the terminal of each user is connected to a pair of transmission control units in two communication loops. The transmission control units bypass routes within loops where faults exists without disabling the entire loop. Unfortunately, the device of Mori et al is limited to a double loop transmission system.

In view of the foregoing discussion it is apparent that there currently exists a need for enhancing the availability of communication paths between geographically displaced data processing systems. The system should optimize the expense such that in addition to traditional redundancy of transmission lines, cross communication between separate lines should be available with only the faulty areas within the lines being isolated. The present invention is directed towards satisfying that need.

SUMMARY OF THE INVENTION

The invention provides a means of enhancing the survivability and availability of communication lines between geographically displaced data processing systems.

The invention is a survivable local area bus network capable of providing continued interprocessor communications in the event of multiple bus outages. It consists of mutiple busses, bus isolation devices (BIDs) and two types of network interface processors (NIPs). The BIDs electrically isolate bus segments on either side of a connection so that, if a fault occurs, only the segment containing the fault will be affected. The first type of NIP connects to one bus and performs the usual function of providing an electrical and software interface between the network and one or more subscriber processors. The second type is a bridge which performs these same functions but connects to two busses and has the capability to transfer traffic as it appears on either bus to the other. The network provides increased survivability in the event of failed segments but does not entail the expense of a fully redundant system.

It is a principal object of the invention to provide a unique multipath transmission network between geographically remote data processing systems.

It is another object of the invention to provide a communications system with means for ensuring transmission between remote stations in the event of substantial damage to or destruction of major portions of the interconnecting transmission lines.

These together with other objects, features, and advantages of the invention will become more readily apparent from the following detailed description when taken in conjunction with the accompanying drawing, wherein like elements are given like reference numerals throughout.

DETAILED DESCRIPTION OF THE PREFERRED EMBODIMENT

This invention provides a means of enhancing the survivability and availability of communication between geographically remote date processing systems or other communication devices.

Traditional methods of improving the survivability of a bus network include hardening the bus so that faults are difficult to introduce; employing redundant busses and providing switching among them in the event of an outage, so that more faults are required to disrupt communications; or some combination of hardening and redundancy.

Figure 1:
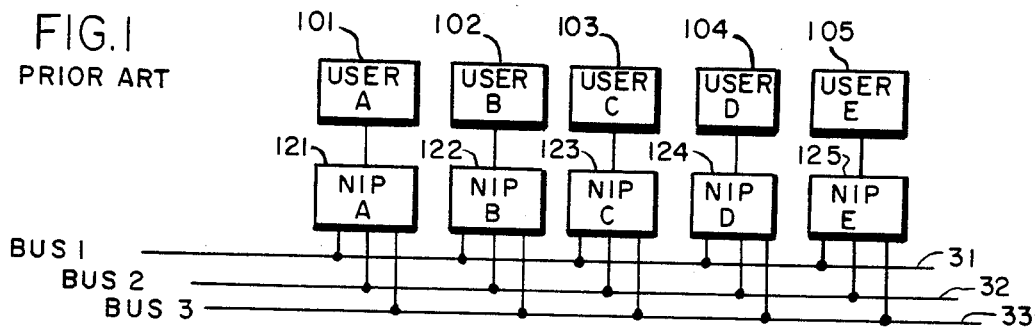
FIG. 1 is a illustration of a prior art redundant bus network.

FIG. 1 is an illustration of a prior art technique which utilizes the traditional method of redundancy. In the system of FIG. 1 the attempt to ensure communication consists of three busses 31-33. The subscriber device of each user 101-105 (which may be a data processor device, terminal or computer) are attached to each bus through their own network interface device 121-125 which switches between active busses in the event of a bus fault.

The redundant busses 31-33 are laid along geographically separate paths, so that no disrupting influence is likely to affect more than one bus. Although the redundant bus network is more survivable than a single-bus network, a break in one of the redundant busses will still disrupt communications on the entire bus, and a fault in every bus will disrupt the network. In addition, the redundant bus network is costly, because it includes redundant transmission facilities and redundant bus interface connections.

Figure 2:
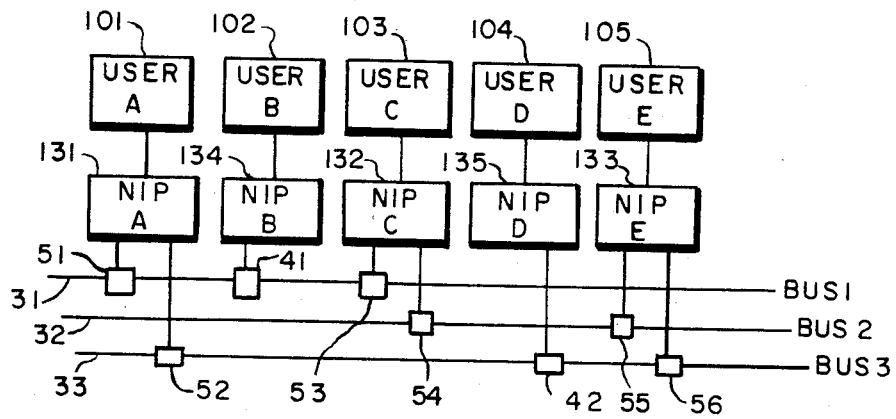
FIG. 2 is an illustration of one embodiment of the survivable local area network.

FIG. 2 is an illustration of one embodiment of the survivable local area network. It consists of multiple busses 31-33 which link two functional types of network interface processors (NIP). The first type of network interface processors 134 and 135, connects to a single bus and performs the usual function of providing an electrical and software interface between the network and one or more of the user subscriber devices 101-105. For the purposes of the specification, each "users subscriber device" as depicted as 101-105 is defined to mean "one particular location in a community of users where the user may attach one of any number of separately attached communications devices to the network by the access provided at that location."

The second type of network interface processors 131-133, the bridge, contains a NIP which performs the same functions as the first type, but also connects to two busses and has the capability to transfer traffic as it appears on either bus to the other. The bridge NIP is used to interconnect multiple busses to form the network.

All network inteface processors 131-135 are connected to the busses by bus isolation devices 51-56 and 41-42. The bus isolation device (BID) electrically isolates bus segments on either side of a connection so that if a fault occurs, only the network segment containing the fault will be affected.

The bridge is also used to enable paths around a fault in a bus through other busses. Typically, several bridges will physically join a bus to other busses, but only one will transfer traffic to them. The other bridges will bridge when a fault occurs which isolates a segment of the bus from the rest of the network.

Hence, the network will consist of several busses, each having a subscriber community attached to it by a mix of bridging and non-bridging nodes. Some bridging nodes will pass traffic between one bus and another to form the overall network. Others will initiate bridging in the event of a fault. In this way the network is compartmentalized into a sequence of segments between bridging nodes which can be reconnected, by enabling the appropriate bridges, into a different sequence that excludes a failed segment. As a point of interest, the discussion thusfar has assumed that each bridge connects two busses, in general it could connect more and perform the same functions for them all.

This network structure has several advantages over the redundant bus structure. First it provides greater survivability. The network will continue to operate in the presence of any number of bus faults, as long as there are sufficient bridging nodes to establish communication among the surviving segments, and isolated segments can operate independently of the rest of the network. In addition this structure is less costly, in that fewer connections and less bus media are needed to provide survivability. Also, the survivability and cost vary with the number of busses and bridging NIPs, i.e., the more busses and bridges in the network the greater the cost and survivability. Finally, the media in this structure are not truly redundant. Given a single bus type tree network, survivability is not achieved by adding more media, but by breaking up the media into segments interconnected by bridges and standby bridges.

The prior art network of FIG. 1 is handicapped by the fact that when any bus develops a fault, that bus goes "down" and becomes inoperable to all users. The present invention, without excessive redundancy, is capable of isolating the area of a bus containing faults, yet continue to use the functioning portions of the bus.

Figure 3:
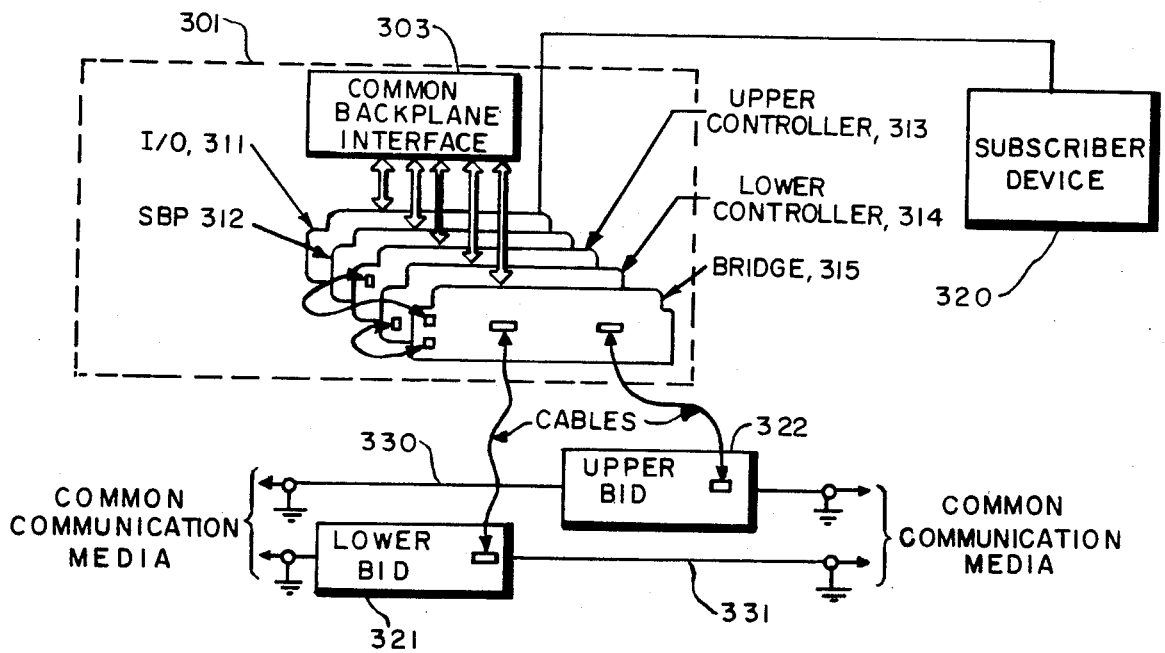
FIG. 3 is a functional diagram of a bridging network interface processor.

FIG. 3 is a functional diagram of a bridging network interface processor 301. In the particular embodiment, the network interface processor is contained in a single card cage with five cards 311-315 which are interconnected with a common backplane interface 303.

The first card is an input/output card 311 which is used to interface the network interface processor with the subscriber device 320. In normal operation the intput/output card 301 will pass all messages through the common backplane interface 303 to the bridge 315, which in turn passes all messages to the active bus isolation device 322 onto the bus 330 which is interconnected with other geographically remote data processing systems.

The second card is the single board processor 312. In this particular embodiment the single board processor is in Intel Corporation 8086 16-bit microprocessor which is interconnected by the input/output card 301 with the user computer to perform user interface, test, protocol processing and the control over reconfiguring the network to isolate faults and outages.

As described above, the overall scheme for reconfiguring a network such as that in FIG. 2 to continue operation in the event of one or more bus outages is to employ standby bridges to monitor the network, detect bus outages, and then initiate bridging to configure communication paths around them. Since all subscribers in a bus network can hear all traffic, the fact that any two paths of the network are isolated from one another can be detected by inserting traffic into one part and listening for it on the other. If the traffic sent in one part is not received on the other, in the appropriate transmission time, then the two paths are known to be isolated. Thus, the basic procedure defined for detecting faults in the network is for each standby bridge to insert test traffic into one of its attached busses and listen for it on the other.

Once a link outage is detected the problem is to identify the combination of standby bridges that can be enabled to create a path around it. In addition, the paths so created must not include loops that will cause signals from a given node to appear at any point in the network more than once. In this general context the problem appears complex. However the problem has been simplified considerably by making a few observations on the properties of shared-access media. First, since all subscribers on a broadcast medium hear all signals, then one bridge connecting two paths of the network is sufficient for all subscribers attached to both parts to hear each other. Conversely, more than one bridge connecting two parts of the network, will cause signal duplication.

In order to join two isolated parts of the network, one and only one standby bridge can begin bridging between them. Since the standby bridge which detected the fault connects the isolated subnetwork, it can reestablish communications by bridging traffic between them. The procedure for reconfiguring the network once an outage is detected by a standby bridge is simply for the standby bridge to begin bridging. Thus the single board computer, by means of the upper controller 313, directs the active upper BID 322 to send the test message and the lower controller 314 listens for the message to be received through the lower BID 321 on a separate bus 331. Normally only one BID is active for transmitting messages from the user data processor end receiving messages from other areas. However, when a fault occurs in the system preventing reception of the test message on the lower BID 321, the single board processor directs activation of the bridge 315 to join the two isolated parts of the network.

The above procedure assumes that only one standby bridge can transmit on the network at once. Otherwise, more than one standby bridge could detect the outage and begin bridging. Since as indicated earlier any subscriber can transmit to any other subscriber in a broadcast network, then all such networks must employ protocols to distribute access to the media among the subscribers. The one-bridge-at-a-time requirement can be met by employing any media access control protocol which guarantees that a subscriber standby bridge will have exclusive control of the network for a sufficient time to perform the test. This embodiment will use an adaptation of the token-passing bus media access protocol, which has this property.

The procedure for restoring network operation after reconfiguration utilizes the features of a draft token-passing bus media access control protocol known in the art. Under this protocol, the right of transmission on the network is distributed by means of a control message called a token. The token is passed from one node to another until every node has received it. The last node in the sequence passes it to the first, continuing the process. The sequence of the nodes receiving the token in this cycle is called the logical ring and the nodes that participate are called members of the logical ring.

Standby bridges will be members of the logical ring, and will detect outage by transmitting test message periodically on one of its attached links, while listening on the other. If the bridge detects an outage, it retains the token, initiates bridging which reconfigures the network, and then restores communication by passing on the token to the next member of the logical ring. These are other aspects of the recovery procedure. For example, the protocol has the inherent capability to detect loss of a token and reinitiate the logical ring, and it is possible that by the time a standby bridge receives a token on one of the two separate subnetworks, a separate logical ring may have been formed in the other. The recovery procedure accommodates such particulars.

Figure 4:
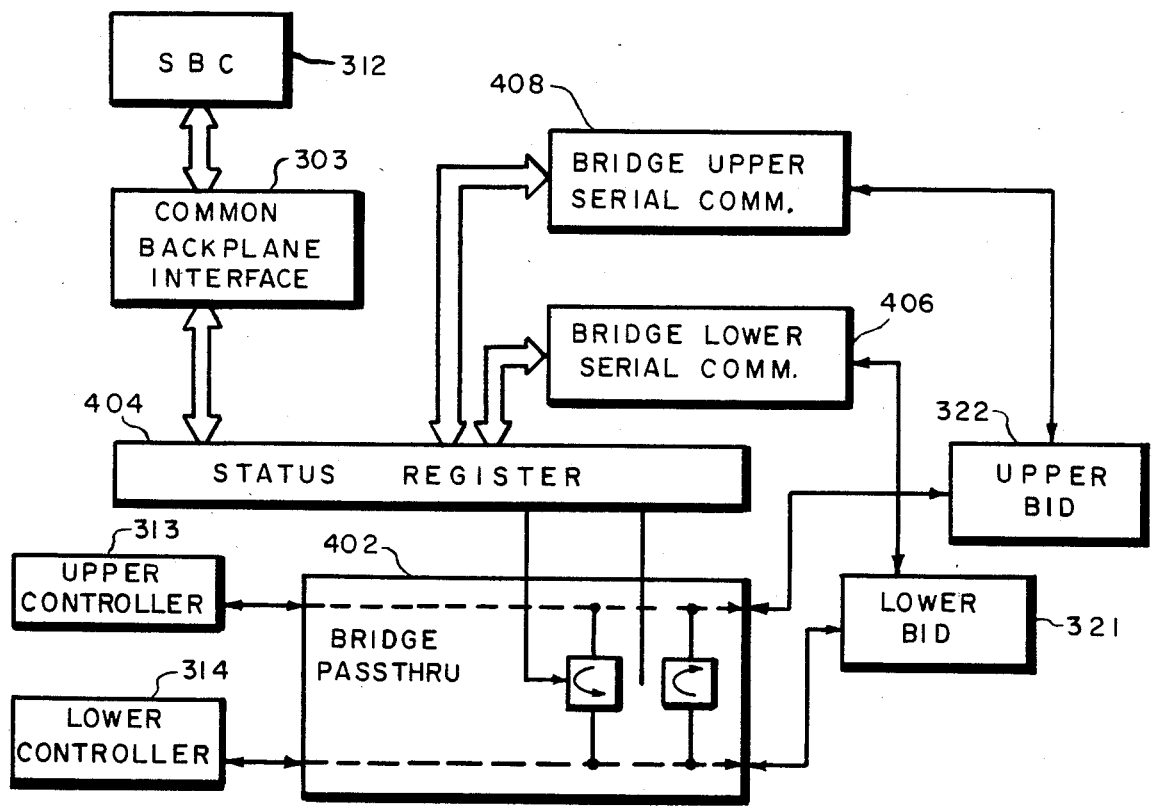
FIG. 4 is a functional block diagram of the bridge card used in a bridging network interface processor.

FIG. 4 is a functional block diagram of the bridge card used in a bridging network interface processor. The bridge consists of passthru circuitry 402, the multibus interface 303 to the single board computer 312, a pair of serial communications circuits 406 and 408 to the upper and lower bus isolation devices 321 and 322, and a status register 404.

The bridge, under the software and protocol control of the single board processor 312 will pass messages between the two bus isolation devices 321 and 322 that results in a message link between two busses.

The serial communication circuits 406 and 408 enable the exchange of status and control information between the two bus isolation devices 321 and 322 and the single board processor 312 via the Status Register 404 and the common backplane interface 303.

The passthru circuit 402 connects the upper and lower contoller 313 and 314 with their respectively bus isolation devices 321 and 322. Each BID monitors its bus and transmits all messages to the bridge. The bridge passes these messages to the respective controller 313 and 314. Likewise messages emanating from the user terminal or computer via the I/O card 311 of FIG. 3 through the common backplane interface 303 to the controller 313 and 314 are passed onto the BIDs for immediate insertion on the busses.

The message path between the subscriber device and one bus isolation device 322 via its controller 313 is always open in normal operations. However, when the bridge is activated, the subscriber device will send and receive via both controllers 313 and 314 on both bus isolation devices.

When the bridge is activated by the single board computer the bridge passthru 402 provides two gated paths between the BIDs. Messages received on the upper BID 322 are transmitted to the lower BID 321 and vice versa.

The bridge passthru circuit 402 when activated will result in established communications between two previously separate busses. One method of initiating this restoration procedure occurs when the single board processor 312 directs one of the controllers 313 or 314 to send the test message out its associated BID 321 or 322 and then listens for the reception of the message on the other BID.

If the test message is not received on the other BID the corresponding serial communications circuit 406 or 408 will send a change in status count to the status register 404. The status register in turn will toggle the bridge passthru to provide a message path between both BIDs as described above and restore communications to two separate portions of the communications network.

Figure 5:
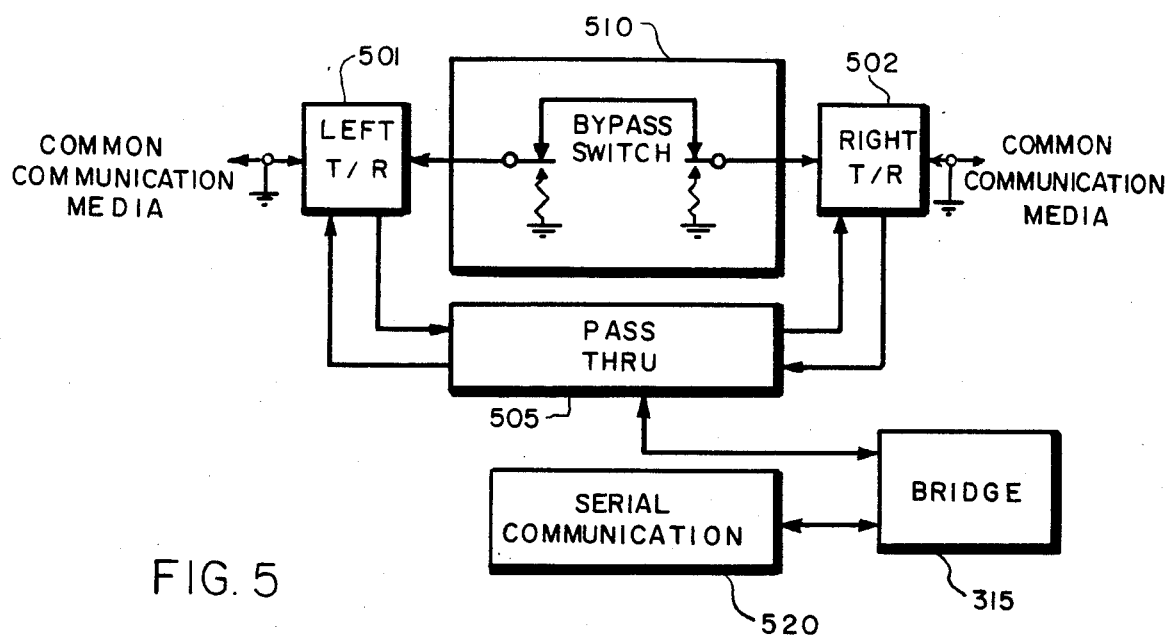
FIG. 5 is a functional diagram of a bus isolation device.

FIG. 5 is a functional diagram of a bus isolation device which contains two transceivers 501 and 502 along with the BID pass thru circuit 505, the serial communication circuit 520 and a bypass switch 510.

The BID passthru 505, the major active element in the BID serves to pass messages between the transceivers and the bridge 315. In the normal mode of operation, all message including collisions entering the passthru from any one of the transceivers 501 and 502, is routed to the other one. This contrasts with standard protocols, which prevent transmission when a collision occurs.

The two transceivers 501 and 502 transmit and receive messages upstream and downstream on the common communication media. This includes both messages generated from the subscriber device served by the BID and all messages entering any one of the transceivers is passed along by the other one.

The bypass switch 510 is a relay, known in the art, which provides continuity by permitting passive message transfer thru the BID on the bus when power is removed from the BID.

The serial communication circuit 520 relays the reception of a test message to the corresponding serial communications circuit in the bridge 315.

Figure 6:
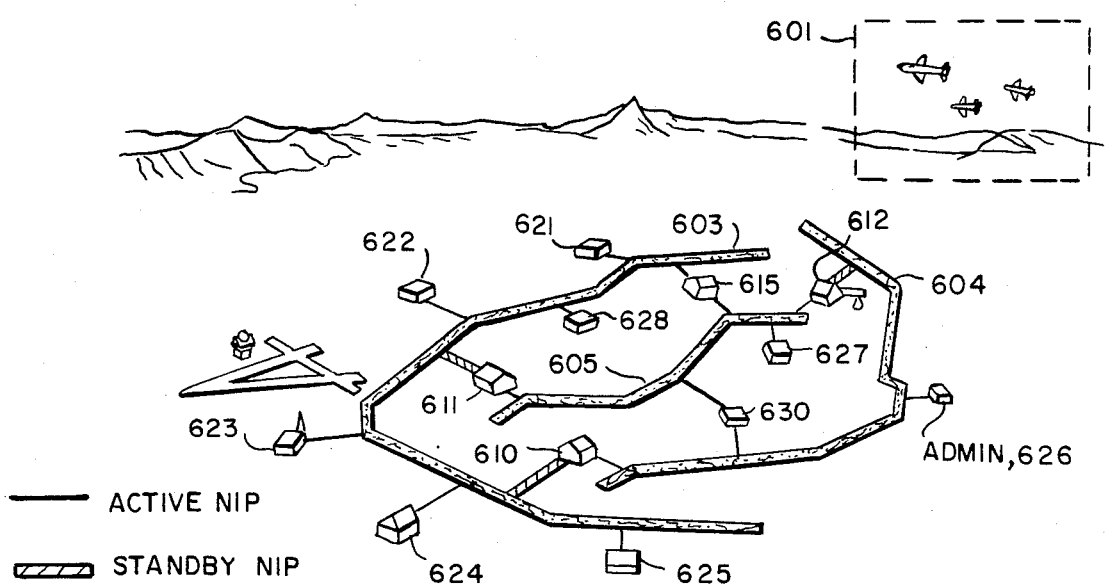
FIG. 6 is a sketch of a military base using the present invention before an attack.

FIG. 6 is a sketch of a military base using the present invention as its communications network before an attack. The approaching disrupting influence 601 in this example is hostile aircraft, but communications could be disrupted for a variety of reasons.

The base is interconnected by three separate communication busses 603, 604 and 605. Three of the users or subscribers 610, 611 and 612 are connected to two busses with a bridging network interface processor which is in standby. One subscriber 630 is connected to two busses with a bridging network interface processor which is active: the NIP is already transferring communications between both busses. Eight users 621-628 are connected to a single bus with non-bridging network interface processors.

Figure 7:
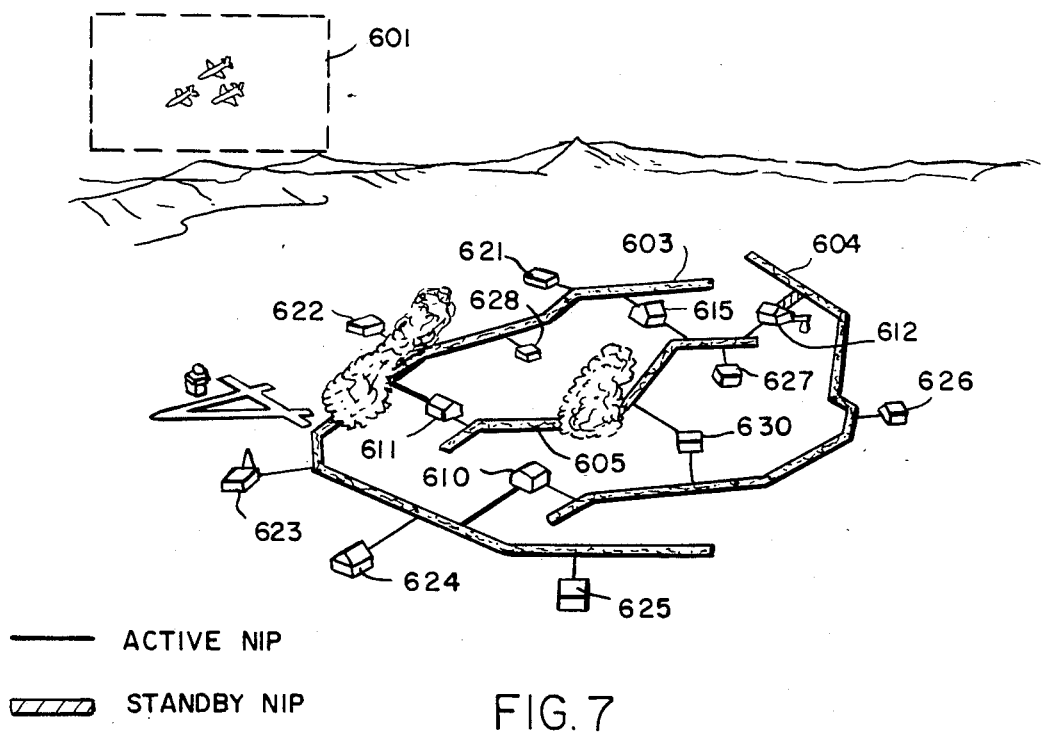
FIG. 7 is a sketch of the military base of FIG. 6 after an attack.

FIG. 7 is a sketch of the same military base in FIG. 6 after an attack. The disrupting influence 601 has departed leaving devastation. However despite the breaks in two busses 603 and 605 complete communication has been maintained as the three users with bridging network interface processor 610 and 611 have switched from standby to active. FIG. 7 is meant to dramatically depict how the present invention with an extreme minimum of communication network redundancy possesses an extremely flexible means of enhancing the survivability and availability of communications between geographically remote data processing systems or other communications devices.

While the invention has been described in its presently preferred embodiment it is understood that the words which have been used are words of description rather than words of limitation and that changes within the purview of the appended claims may be made without departing from the scope and spirit of the invention in its broader aspects. For example, the communication media need not be a bus but may range from microwave, electromagnetic, optic or infrared transmitted signals to telephone lines.

What is claimed is:

1. A survivable local area communications system comprising:
   n communications media, n being an integer,
   p user devices having access to said communications media, p being an integer,
   m first media interface devices, m being an integer, providing access locations for m user devices to said communications media by, bridging two media and electrically connecting them to one of the user devices, n-1 first interface devices being in an active mode transmitting data between media and effecting a continuous media network, and m-(n-1) first interface devices being in a standby mode and periodically and sequentially testing said media network for continuity and converting to active mode operation in response to detected discontinuity condition, each of said first media interface devices being a bridging network interface processor providing an interface between its said user devices and two media, said network interface processor periodically and sequentially testing said media network for continuity when in said standby mode by transmitting a test message out a first media isolation device over the first of said two media, and listening for reception of said test message over a second media isolation device from the second of said two media, said bridging network interface processor maintaining said standby mode upon reception of said test message and converting to said active mode operation upon a failure of said second media isolation device to receive said test message,
   r second media interface devices, r being an integer of value (p-m) providing access locations for r user devices to a single media by electrically connecting one of the devices to a single media, and
   a multiplicity of first, second and third media isolation devices said first and second media isolation devices being connected in said media at the access locations of said first media interface devices as they connect with said media, said third media isolation devices being connected in said media at the access locations of said second media interface devices as they connect with said media.

2. A survivable local area communication system as defined in claim 1 wherein each said third media isolation device comprises:

first and second transceivers, said first transceiver receiving and transmitting data between a selected second media interface device and the media in one direction, said second transceiver receiving and transmitting data between a selected second media interface device and the media in the other direction, and a bypass switch which is electrically connected to the first and second transceivers and permits passive message transfer through it in the event of a power loss to the selected second media interface device by providing a direct connection between said first and second transceivers.

3. A survivable local area communication system as defined in claim 2 wherein said first media isolation device comprises, third and fourth transceivers, said third transceiver receiving and transmitting data between a selected first media interface device and the media in one direction, said fourth transceiver receiving and transmitting data between a selected first media interface device and the media in the other direction, a bypass switch which is electrically connected to the first and second transceivers and permits passive message transfer through it in the event of a power loss to the selected second media interface device by providing a direct connection between said third and fourth transceivers, a first communications circuit relaying messages generated by said bridging network interface processor to said third and fourth transceivers for transmission over said communications media, and a passthru serving to pass messages between said third and fourth transceivers and said bridging network interface processor.

4. A communications system as defined in claim 2 wherein said second media isolation device comprises:

third and fourth transceivers, said third transceiver receiving and transmitting data between a selected first media interface device and the media in one direction, said fourth transceiver receiving and transmitting data between a selected first media interface device and the media in the other direction, a bypass switch which is electrically connected to the third and fourth transceivers and permits passive message transfer through it in the event of a power loss to the selected second media interface device by providing a direct connection between said third and fourth transceivers, a second communications circuit relaying the reception of said test message when received by said third and fourth transceiver to said bridging network interface processor during said standby mode, and a first passthru serving to pass messages between said third and fourth transceivers during said standby mode, said first passthru circuit not transmitting messages between said bridging network interface processor during said standby mode, said first passthru circuit serving to pass messages between said third and fourth transceivers and said bridging network interface processor during said active mode.

5. A communications system as defined in claim 4 wherein said bridging network interface processor comprises:

an input/output interface interfacing said bridging network interface with one of said user devices to perform, test, protocol processing and control over reconfiguring the network to isolate faults and outages, said protocol processing governing when said microprocessor directing a change from said standby mode to said active mode upon the failure of said second media isolation device to receive said test message, an upper media controller directing said first media isolation device to send said test message when directed by said microprocessor, a lower media controller to relay to said microprocessor the reception of said test message by said second media isolation device, and a bridge circuit which implements said active mode when directed by said microprocessor by directing said first passthru circuit of said second media isolation device to pass messages between said first and second transceiver of said second media isolation device and to said bridging network interface processor, and an interface connection that provides interconnection between said input/output interface, said microprocessor, said upper media controller, said lower media controller and said bridge circuit.

6. A communications system as defined in claim 5 wherein said bridge circuit comprises:

a second passthru circuit passing messages between said upper media controller and said first passthru circuit of said first media isolation device during said active and standby modes, said second passthru circuit passing messages between said lower media controller and said first passthru circuit of said second media isolation device only during said active mode, a third communications circuit relaying the reception of said test message by said second media isolation device to said bridge circuit, a status register circuit connecting with said third serial communication circuit and indicating to said microprocessor that said standby mode should be maintained when said third serial communication circuit indicates said reception of said test message, said status register circuit indicating to said microprocessor that said active mode should be initiated upon the failure of said third serial communication circuit to indicate said reception of said test message after said test message has been sent by said bridging network interface processor through said first media isolation device.

* * * * *